(12) United States Patent
Shimoyama et al.

(10) Patent No.: US 7,706,130 B2
(45) Date of Patent: Apr. 27, 2010

(54) PROCESS FOR PRODUCING ELECTRODE FOR ELECTRIC DOUBLE LAYER CAPACITOR AND PROCESS FOR PRODUCING ELECTRIC DOUBLE LAYER CAPACITOR EMPLOYING THE ELECTRODE

(75) Inventors: Toru Shimoyama, Chiyoda-ku (JP); Yasuo Shinozaki, Chiyoda-ku (JP)

(73) Assignee: Asahi Glass Company, Limited, Tokyo (JP)

( * ) Notice: Subject to any disclaimer, the term of this patent is extended or adjusted under 35 U.S.C. 154(b) by 606 days.

(21) Appl. No.: 11/690,359

(22) Filed: Mar. 23, 2007

(65) Prior Publication Data

US 2008/0028583 A1  Feb. 7, 2008

(30) Foreign Application Priority Data

Mar. 24, 2006  (JP) ............................... 2006-084182

(51) Int. Cl.
*H01G 9/04* (2006.01)

(52) U.S. Cl. ..................... 361/508; 361/502; 361/503; 361/512; 361/523

(58) Field of Classification Search .................. 361/502, 361/503–504, 508–512, 516–519, 523, 525, 361/528–529; 29/25.01, 25.03
See application file for complete search history.

(56) References Cited

U.S. PATENT DOCUMENTS

| 4,862,328 | A | 8/1989 | Morimoto et al. |
| 5,277,729 | A | 1/1994 | Endo et al. |
| 6,201,686 | B1 * | 3/2001 | Hiratsuka et al. ............ 361/502 |
| 6,243,256 | B1 * | 6/2001 | Furuta et al. ................ 361/528 |
| 6,426,865 | B2 * | 7/2002 | Kasahara et al. ............ 361/512 |
| 6,890,363 | B1 * | 5/2005 | Sakai et al. ................ 29/25.03 |
| 7,206,189 | B2 * | 4/2007 | Reynolds, III .............. 361/502 |
| 7,206,190 | B2 * | 4/2007 | Murakami et al. .......... 361/502 |
| 7,403,371 | B2 * | 7/2008 | Miyaki et al. ............... 361/503 |
| 2002/0054472 | A1 | 5/2002 | Ishikawa et al. |

(Continued)

FOREIGN PATENT DOCUMENTS

JP  63-107011  5/1988

(Continued)

*Primary Examiner*—Nguyen T Ha
(74) *Attorney, Agent, or Firm*—Oblon, Spivak, McClelland, Maier & Neustadt, L.L.P.

(57) ABSTRACT

A process for producing an electrode for an electric double layer capacitor, in which water is used as a forming auxiliary agent and kneading an pulverizing steps are omitted to improve production efficiency, and a process for producing an electric double layer capacitor employing such a electrode, are provided. In a first mixing step, an activated carbon and a carbon black are mixed by a grinder containing a grinding medium. As the grinder containing a grinding medium used in this first mixing step, a commonly used ball mill can be used. In the second mixing step, a mixture is taken out from the grinder containing a grinding medium of the first mixing step, and moved into a second mixer prepared separately. Then, polytetrafluoroethylene as a binder and water as a liquid lubricant are added and the materials are mixed again. Thereafter, a calendar forming is carried out. The mixture obtained by the second mixing step is not a clumpy body of clay state or rubber state but a product which can be easily turned into grains of 1 to 2 mm, by simple means such as a wire sieve.

20 Claims, 6 Drawing Sheets

U.S. PATENT DOCUMENTS

2004/0016440 A1    1/2004    De Laforcade et al.

FOREIGN PATENT DOCUMENTS

| JP | 2-235320 | 9/1990 |
| JP | 7-44127 | 5/1995 |
| JP | 11-283887 | 10/1999 |
| JP | 3028560 | 2/2000 |
| JP | 2001-35756 | 2/2001 |
| JP | 2001-85280 | 3/2001 |
| JP | 2001-307964 | 11/2001 |
| JP | 2003-225547 | 8/2003 |
| JP | 3693254 | 9/2005 |

* cited by examiner

PROCESS FOR PRODUCING ELECTRODE FOR ELECTRIC DOUBLE LAYER CAPACITOR AND PROCESS FOR PRODUCING ELECTRIC DOUBLE LAYER CAPACITOR EMPLOYING THE ELECTRODE

BACKGROUND OF THE INVENTION

1. Field of the Invention

The present invention relates to a process for producing an electrode for an electric double layer capacitor and to a process for producing an electric double layer capacitor employing such an electrode, in particular, to a process for producing an electrode for an electric double layer capacitor, wherein water is used as a forming auxiliary agent and kneading and pulverizing steps are omitted to improve production efficiency, and to a process for producing an electric double layer capacitor employing such an electrode.

2. Discussion of Background

In recent years, electric double layer capacitors, using an electric double layer formed at the interface between a polarized electrode and an electrolyte, particularly those having a coin shape, are increasingly demanded for power sources for memory backup. Meanwhile, for applications requiring large capacities such as power sources for electric automobile use, development of electric double layer capacitors of large capacity per a unit volume, low internal resistance, high energy density and high output density, is desired. Further, for the electric double layer capacitors for memory backup use, reduction of internal resistance is desired.

Here, FIG. 5 shows an example of vertical cross-sectional view of an electric double layer capacitor. Further, FIG. 6 shows a construction view of its element assembly.

In FIGS. 5 and 6, in a single cell 50 of the electric double layer capacitor, an element assembly 1 of column shape impregnated with an electrolytic solution (not shown) is accommodated in an outer casing 21 of cylindrical shape having a bottom portion 21a, and an opening 21b of the outer casing 21 is sealed with a sealing plate 31.

Here, the element assembly 1 is constituted by laminating a pair of electrode bodies 3A, 3B of long strip shape for forming electric double layers at the interfaces between the electrode bodies and the electric solution, and separators 5A, 5B disposed between the electrode bodies 3A, 3B. These electrode bodies 3A, 3B and the separators 5A, 5B are wound to form the element assembly 1. Here, one of the electrode bodies 3A, 3B constitutes a positive electrode, and the other one of them constitutes a negative electrode.

Further, the electrode bodies 3A, 3B have electric collector foils 7A, 7B respectively of long strip shape made of metal, and electrode layers 9A, 9B formed on surfaces of the electric collector foils 7A, 7B respectively. The electrode layers 9A, 9B are composed of a carbonaceous material mainly contributing to exhibit electrostatic capacitance, and a conductive material mainly functioning to increase conductivity, and the electrode layers 9A, 9B are each formed into a sheet shape of about at most 1 mm thick by employing a binder such as polytetrafluoroethylene. The electrode layers 9A, 9B are employed as they are bonded to the electric collector foils 7A, 7B.

As the material contributing to exhibit electrostatic capacitance, a carbonaceous material such as an activated carbon or a polyacene having a specific surface area of a few hundreds to about 3,000 $m^2/g$, are mainly employed. As the conductive material for mainly increasing conductivity, a carbon black having a specific surface area of about 500 to 1,500 $m^2/g$, is mainly employed.

As a method for producing sheet-shaped electrodes, an extrusion molding method has been known, in which a carbonaceous material, a binder and a liquid forming auxiliary agent are mixed, kneaded, and formed into a plate shape of a few millimeters thick by an extrusion method, and the product is rolled into a thin sheet shape (refer to JP-A-63-107011 and JP-A-11-283887).

Or else, a calendar forming method has been known, in which a carbonaceous material, a binder and a liquid forming auxiliary agent are mixed and kneaded, and thereafter, an obtained mixture of clay state or clumpy rubber state is preformed into a stick shape or pulverized into grain state or powder state, and the mixture is passed between two opposing rolls to be directly formed into a sheet shape (refer to JP-A-2001-307964, JP-A-2-235320, JP-A-2001-85280, JP-A-2001-35756 and Japanese Patent No. 3693254).

Among these forming methods, a calendar forming method is more excellent than an extrusion molding method in that it can mold the mixture directly into a thin sheet shape of at most about 1 mm thick. On the other hand, in the extrusion molding method, strong sheering force exerts to the mixture when it is extruded, which promotes unification of the mixture, while in the calendar forming method, sheering force exerted to the mixture at the time of forming is so small that homogenization of the mixture is scarcely promoted. To cope with this problem, in a case of forming the electrode sheet by the calendar forming method, it is considered to be necessary to sufficiently uniformly mixing the carbonaceous material, the binder and the forming auxiliary agent in advance.

The conductive material such as a carbon black is essential to reduce the resistance of an electric double layer capacitor to exhibit its performance, particularly high-output performance. As characteristics of a carbon black for efficiently imparting conductivity, 1) highly developed structure, 2) large specific surface area, 3) small primary particle size, 4) highly developed crystal structure, and 5) small amount of functional groups capturing $\pi$ electron, are listed (source: Saishin Carbon Black Gijutsu Daizenshu; edited by Technical Information Institute Co., Ltd.). As a commercially available conductive carbon black, it has been known that Ketjenblack (manufactured by Ketjenblack International) has a characteristically large specific surface area and shows excellent conductive performance.

However, a conductive material having such a large specific surface area has a large surface energy, small grain size and small bulk density, and thus, such a material tends to agglomerate together, and it has been difficult to uniformly mix such a material with a material such as an activated carbon exhibiting static electric capacitance by a common mixing method. When such an insufficient dispersion occurs, the conductive material becomes to be easily peeled off from an electrode sheet, which may cause deterioration of durability of the electric double layer capacitor or deterioration of working environment, such being not preferred. To cope with this problem, in order to prevent such an insufficient dispersion of conductive material and to uniformly mix such a material, employment of wet-type kneading step using a liquid forming auxiliary agent (kneading auxiliary agent) has been considered to be necessary.

Further, in order to form kneaded product of clay state or rubber clumpy state by the calendar method, a step of pulverizing such a kneaded product to make its grain size uniform is required, which makes production process complicated. Further, as the kneading auxiliary agent, it has been desired to employ water from a viewpoint of minimizing environmental impact, but since a carbon black as a conductive material is hydrophobic, the carbon black tends to agglomerate at a time of kneading to cause insufficient dispersion.

In order to solve such problems, heretofore, methods of mixing a carbonaceous material, a conductive material and a binder as uniform as possible before forming them into a sheet shape, have been proposed.

For example, JP-A-2001-307964, JP-B-7-44127 and JP-A-2001-85280 propose methods of employing an organic solvent as a forming auxiliary agent. However, when such an organic solvent is employed, impact on environment increases or an explosion-proof type facility should be necessary in an organic solvent removal step in the process of producing electrode sheets, and thus, a method requiring minimum organic solvent has been desired.

Meanwhile, Japanese Patent No. 3028560 and JP-A-2003-225547 propose a dry type forming method not employing an auxiliary agent. However, in such a method, since an activated carbon, a carbon black and polytetrafluoroethylene have significantly different physical properties, in a case where a rotating blade or a bar shaped tool is employed, the carbon black significantly tends to be suspended and the carbon black hardly be mixed into portions where mixing or compression occurs, and thus, it has not been possible to produce a long sheet having uniform characteristic and sufficient strength.

Further, for the forming step, methods of mixing and kneading a carbonaceous material such as an activated carbon, a conductive material such as a carbon black, a binder such as polytetrafluoroethylene and a forming auxiliary agent in advance to carry out forming, have been proposed (refer to JP-A-2001-35756 and Japanese Patent No. 3693254). However, since this method uses a kneading machine such as a kneader and the kneaded product becomes to be in a state of clumpy body, a step of pulverizing such clumpy bodies becomes required to deteriorate productivity or causes mixing of impurities from production equipment. Further, if too large sheering force is applied to such clumpy bodies by a kneading machine such as a kneader, PTFE as a binder is excessively fibrillated, which makes the sheet brittle and which may cause significant loss.

SUMMARY OF THE INVENTION

The present invention has been made considering such conventional problems, and it is an object of the present invention to provide a process for producing an electrode for an electric double layer capacitor, in which water is used as a forming auxiliary agent, and kneading and pulverization steps are omitted to improve production efficiency, and a process for producing an electric double layer capacitor employing such an electrode.

For this purpose, the first aspect of the present invention provides a process for producing an electrode for an electric double layer capacitor, the electrode containing at least two carbonaceous materials and an organic binder, the process comprising a first mixing step of mixing the carbonaceous materials by a grinder containing a grinding medium, a second mixing step of adding polytetrafluoroethylene and a liquid lubricant to the mixture obtained in the first mixing step and mixing them by a wet method, and a forming step of forming the mixture obtained in the second mixing step into a sheet shape by passing the mixture between two opposing rolls.

In the first mixing step, by carrying out mixing by a grinder containing a grinding medium, it is possible to produce a state in which at least two types of carbonaceous materials are sufficiently mixed. For this reason, a conventional kneading or pulverizing step before a forming step becomes unnecessary, which improves production efficiency. Here, mixing by the grinder containing a grinding medium is preferably carried out by a dry method. This mixing method shows an effect not obtainable by a stirring method of e.g. a Henschel mixer. Thus, since sufficiently mixed state can be realized by the first mixing step, it is possible to reduce portions locally having high hydrophobic property and tending to be so-called "dama" when polytetrafluoroethylene and a liquid lubricant is added in the second mixing step, which decreases insufficient dispersion.

Further, the second aspect of the present invention provides the above process wherein the carbonaceous materials comprise an activated carbon and a carbon black having a specific surface area of from 500 to 1,500 $m^2/g$.

Since an activated carbon has higher hydrophilic property than a carbon black, the carbon black and the activated carbon are sufficiently mixed in the first mixing step, which minimizes partial aggregation of carbon black which tends to cause insufficient dispersion.

Further, the third aspect of the present invention provides the above process wherein in the second mixing step, the liquid lubricant is a water, and the polytetrafluoroethylene and the water are added as an aqueous dispersion of polytetrafluoroethylene containing a surfactant.

Employment of water for liquid lubricant reduces impact on environment, makes explosion-proof facilities unnecessary, and enables to produce electrode for the electric double layer capacitors at low cost.

Further, the fourth aspect of the present invention provides the above process wherein the aqueous dispersion of polytetrafluoroethylene contains polytetrafluoroethylene at a concentration of from 0.3 to 50.0% based on total mass of the aqueous dispersion, and contains the surfactant at a content of 3.0 to 12% based on polytetrafluoroethylene.

By adding the aqueous dispersion of polytetrafluoroethylene of appropriate concentration, product after the mixing step does not become clumpy, and it can be easily discharged from a mixer used in the second mixing step.

Further, the fifth aspect of the present invention provides the above process wherein the amount x (weight ratio) of water in the mixture obtained in the second mixing step, is a value represented by formula (1) provided that the weight ratio of the activated carbon based on total solid content is (a) and the pore volume of the activated carbon is V$cm^3/g$.

If the amount of water is less than the range represented by formula (1), molded product tends to be too brittle to be formed into a sheet shape. On the other hand, if the amount of water is more than the range of formula (1), molded sheet becomes too soft, which may cause problems such that the sheet adheres to rolls for forming, the sheet is broken at a time of retrieving, or the sheet is wrinkled to prevent forming of a long sheet.

Further, the sixth aspect of the present invention provides the above process wherein the mixture obtained in the second mixing step is a granulated product at least 80% by mass of which has a grain size of at most 2 mm in diameter.

The mixture obtained by the second mixing step is not a clay-state product or rubber-state clumpy product but a granulated product which can be easily turned into grains of at most 2 mm in diameter by a simple means such as a wire sieve. Accordingly, there is no need of applying a pulverizing step, which improves productivity and which can prevent intermixing of impurities from a pulverizer.

Further, the seventh aspect of the present invention provides the above process wherein a mixer having a blade is used in the second mixing step, and the mixing is carried out by rotating the blade at a rotational speed producing a peripheral velocity of from 10 to 45 m/sec at the leading edge of the blade.

By this method, mixing can be carried out uniformly in a short time, which facilitates fibrillation of polytetrafluoroethylene and enables to carry out subsequent calendar forming easily and efficiently.

Further, an eighth aspect of the present invention provides a process for producing an electric double layer capacitor, which is a process for producing an electric double layer capacitor comprising a positive electrode, a negative electrode, a separator disposed between the positive electrode and the negative electrode, and an electrolytic solution, wherein the positive electrode and the negative electrode are produced by any one of the above processes.

As described above, according to the present invention, since the materials are mixed by a grinder containing a grinding medium by a dry method in the first mixing step, it is possible to produce a state that at least two types of carbonaceous materials are sufficiently mixed. Accordingly, conventional kneading or pulverizing step before the forming step becomes unnecessary, which improves production efficiency.

DETAILED DESCRIPTION OF THE PREFERRED EMBODIMENTS

Figure 1:
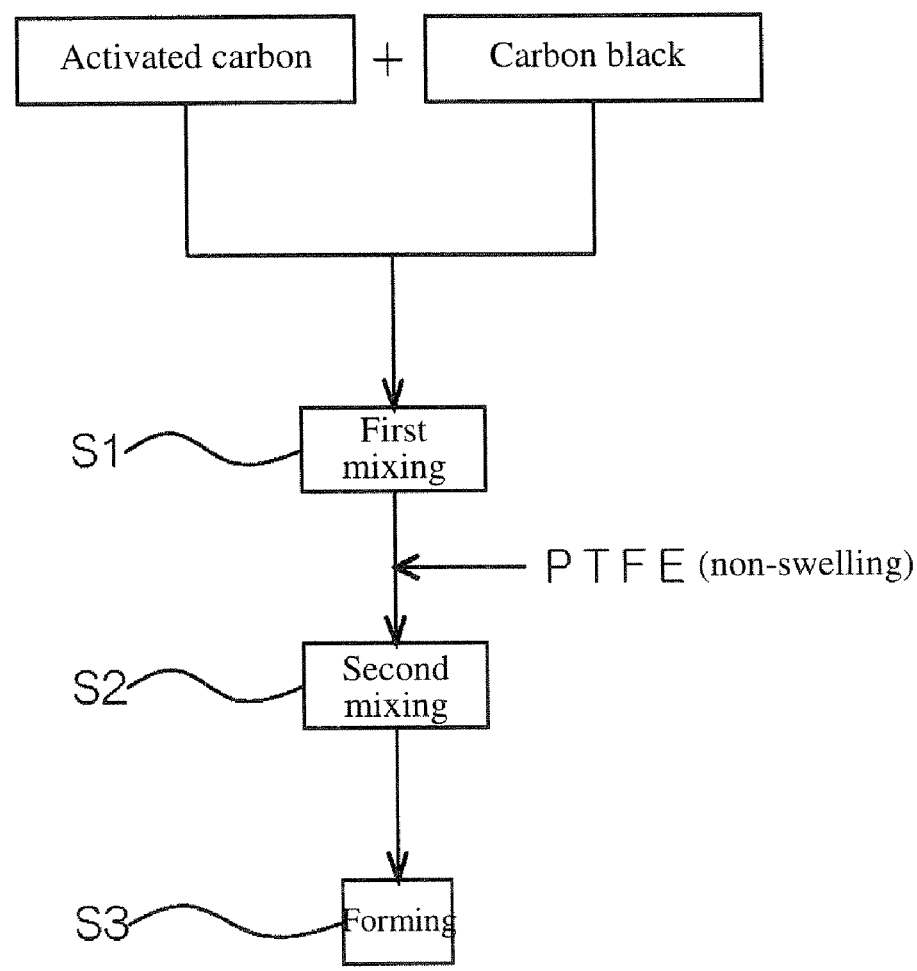
FIG. 1 is a view showing schematic production process of an electrode as an embodiment of the present invention.

From now, embodiments of the present invention are described. FIG. 1 shows a schematic production process of an electrode as an embodiment of the present invention. Here, since a point that a produced sheet is used as an electrode layer is common to conventional electric double layer capacitors, explanation of the construction of an electric double layer capacitor is omitted.

In FIG. 1, in the first mixing step of step 1 (abbreviated to S1 in the Figure and the abbreviation is applied to other steps), an activated carbon and a carbon black are mixed by a grinder containing a grinding medium. As the activated carbon, a phenol resin type, a rayon type, an acryl type, a pitch type or a coconut shell type may be used, one having a grain size of 0.1 to 100 μm, particularly one having 1 to 20 μm, is preferred since such an activated carbon is easily formed into a thin film and its volume density can be easily increased.

As the grinder containing a grinding medium used in this first mixing step, a commonly used ball mill can be used. This grinder containing a grinding medium is used not for pulverization but for mixing. For this reason, in a case where an activated carbon whose grain size distribution is adjusted in advance is employed, the ball mill is preferably one not changing grain size distribution (usually center grain size of the distribution is microns to tens of microns), and for this purpose, it is preferred to employ balls made of nylon. Further, nylon balls each having a metal core may also be employed. However, in a case of adding a conductive material to an activated carbon having a large grain size and mixing and pulverizing of these materials are carried out at the same time, balls of a metal or a ceramics may be used.

A grinder containing a grinding medium is a grinder of cylinder-rotating type wherein a cylinder rotates or vibrates to drive a grinding medium contained in the cylinder, or a grinder of stirring type containing grinding medium wherein a stirring mechanism in a container drives a grinding medium. As the cylinder-rotating type, a rolling mill, a vibration mill and a planet mill are used, and a rolling mill is usually called as a ball mill. The medium-stirring type is usually categorized into a tower type, a stirring vessel type, a circulation tube type, an annular type and the like by a type of container (source: Biryushi Kogaku Taikei (fine particle engineering system) first edition basic technology, edited by Fuji Technosystem). Any one of these types may be employed, and one suitable for e.g. production size or raw material composition, may be selected.

As parameters of operation conditions of a ball mill, in a case of batch type, the ratio among amount of balls, amount of raw material to be put and amount of space, rotation speed and rotation time are mentioned. These parameters may be set optimally according to characteristics and the ratio between an activated carbon and a carbon black to be processed. By this first mixing step using a ball mill, the carbon black and the activated carbon can be uniformly mixed, and it is possible to minimize portions having high hydrophobic property and tending to cause insufficient dispersion.

If a piece of equipment other than a grinder containing a grinding medium, such as a stirring type mixer such as a Henschel mixer not using a grinding medium, is employed for the first mixing step, a carbon black tending to be agglomerated is not sufficiently mixed with an activated carbon, and as a result, when aqueous dispersion of polytetrafluoroethylene is mixed, a mixture in a state of so-called "dama" in which the carbon black is agglomerated, is produced.

The carbon black is required to have a specific surface area of 500 to 1,500 m$^2$/g to increase conductivity. For example, Ketjenblack EC600JD manufactured by Ketjenblack International has a specific surface area of 1,270 m$^2$/g, and EC300J has that of 800 m$^2$/g.

Then, the process proceeds into the second mixing step as step 2, and in the second mixing step, a mixture is taken out from the grinder containing a grinding medium of the first mixing step, and moves the mixture into a second mixer prepared separately. Then, polytetrafluoroethylene as a binder and water as a liquid lubricant are added and mixed again. The polytetrafluoroethylene includes not only a homopolymer of tetrafluoroethylene but a copolymer obtainable by copolymerizing tetrafluoroethylene with at most 0.5 mol % of another monomer. If such another monomer is at most 0.5 mol %, melt fluidity is not imparted to the polytetrafluoroethylene, and the polytetrafluoroethylene is fibrillated in the same manner as a homopolymer of tetrafluoroethylene, whereby a sheet electrode having high strength and low resistance can be produced. As such another monomer, hexafluoropropylene, chlorotrifluoroethylene, perfluoro (alkyl vinyl ether), trifluoroethylene, (perfluoroalkyl)ethylene or the like may be used.

Since polytetrafluoroethylene having low molecular weight tends to be in a state of liquid or gel and is not easily fibrillated, the polytetrafluoroethylene preferably contains at least 50 wt % of polymer having a molecular weight of at least 1×10$^6$ calculated from standard relative density. Further, the polytetrafluoroethylene is preferably one obtained by emulsification polymerization since it is easily fibrillated.

Here, since polytetrafluoroethylene itself does not have dispersibility into water, one dispersed in an aqueous dispersion employing a surfactant, is employed. The aqueous dispersion is usually used for a coating agent, a binding agent, an additive to resin, heat-resistant painting material or the like. As a stabilizing agent, a nonion type surfactant is used and an environment-friendly surfactant is also used in recent years.

With respect to the aqueous dispersion of polytetrafluoroethylene, since it is necessary that a mixture produced by the mixing step does not become clumpy but in a state easily dischargeable from the second mixer, the aqueous dispersion preferably contains polytetrafluoroethylene at a concentration of 0.3 to 50% based on total mass of the aqueous dispersion, and contains a surfactant at a concentration within a range of 3.0 to 12% based on total mass of the polytetrafluoroethylene. These figures are decided according to e.g. physical properties such as pore volumes of the activated carbon and the carbon black to be employed, the ratio between them or the ratio of polytetrafluoroethylene.

The second mixer to be employed in the second mixing step is not particularly limited so long as it can mix a powder and a liquid. As an example of a mixer which can mix materials uniformly in a short time, which promotes fibrillation of polytetrafluoroethylene to facilitate subsequent calendar forming, and which realizes good yield, a Henschel mixer manufactured by Mitsui Mining Co., Ltd. is used.

The amount x (weight ratio) of water in the mixture obtained by the second mixing step is represented by formula (1) provided that the weight ratio among the activated carbon, the carbon black and polytetrafluoroethylene is a:b:c (a+b+c=1) and the pore volume of the activated carbon is $V cm^3/g$.

$$((V/(V+1/a)) \times 0.85) < x < (V/(V+1/a)) \quad (1)$$

Here, the amount of surfactant contained in the aqueous dispersion of polytetrafluoroethylene is included in the amount of water.

Then, calendar forming is carried out in step 3, and in this step, if the amount of water is less than the range of formula (1), a product formed in the step becomes too brittle to be formed into a sheet. On the other hand, if the amount of water is larger than the range of formula (1), the sheet formed in the step becomes too soft and the sheet may adhere to forming rolls, or may be broken at a time of retrieving, or the sheet may be wrinkled at a time of rolling, to prevent forming of long sheet.

Here, the mixture obtained in the second mixing step is not a clumpy body of clay state or rubber state but a granulated product which can be turned into grains of from 1 to 2 mm easily by simple means such as a wire sieve. Accordingly, since a pulverizing step is not required, productivity is good and it is possible to prevent intermixing of impurities from a grinder.

By the way, when these at least two carbonaceous materials and the aqueous dispersion of polytetrafluoroethylene are mixed all at once, the carbon black becomes to be in a state of so-called "dama" in which the carbon black is agglomerated since a carbon black has a high hydrophobic property. If such a material is directly formed into a sheet, many irregularities of the carbon black remain on a surface of the sheet.

If an organic solvent is used instead of the aqueous dispersion, even when the mixing is carried out all at once, it is possible to prevent insufficient dispersion of carbon black. However, if the organic solvent is designated as a hazardous material under the Fire Defense Law, a mixing or kneading apparatus or a dryer for removing solvent needs to be provided with explode-proof functions, which increases equipment cost. Further, when an organic solvent having high flashing point is used, high temperature or a long time is required for removing the solvent, which increases production cost.

EXAMPLES

Next, the present invention is described specifically with reference to Examples and Comparative Examples.

First of all, steps common to the following Examples are shown.

As a grinder containing a grinding medium used in the first mixing step, a ball mill of cylinder shape having an inner diameter of 190 mm and an inner volume of 5 L was employed. As balls, nylon balls (distributed by As One Corp., model number ND-7) of 3/8 inch in diameter, or nylon balls (manufactured by Chuo Kakoki Corporation) of 10 mm in diameter each containing an iron core, were employed. About 2.4 L of the balls were entered and an activated carbon and a carbon black were added on the balls, a cap was set and the ball mill was operated at 50 rpm for 30 minutes. Thereafter, a wire sieve was employed to isolate the balls, and the mixed powder was recovered. This operation was repeated for 8 batches, and the mixed powder obtained was subjected to the second mixing step.

In the second mixing step, the above mixed powder was put into a Henschel mixer (employing two stages of blades for mixing) having an inner volume of 75 L, and an aqueous dispersion of polytetrafluoroethylene (manufactured by Asahi Glass Company, Limited, Fluon PTFE dispersion XAD911 diluted by ion-exchanged water was added. At this time, rotational speed of the blades was 220 rpm (peripheral velocity was 5 m/sec) and 3 to 5 minutes were spent to input the mixed powder. Thereafter, the materials were mixed for 5 minutes by the blades rotating at a rotational speed of 1,760 rpm (peripheral velocity was 41 m/sec), and then, a discharge port was opened to take out a granulated product. The granulated product was a moist powder, which is not in a clumpy state like a clay but in a state that it is easily deformable by e.g. being softly grabbed by a hand. The granulated product was sieved by using a wire sieve having a mesh size of 1 to 2 mm, and supplied in a gap between two heated calendar rolls of 140 mm in diameter to obtain a sheet-shaped formed product.

Example 1

In the first mixing step, 8 batches of the materials were mixed, in each of which 238 g of an activated carbon (manufactured by Kuraray Chemical Co., Ltd., a coconut shell type activated carbon, center grain size 7 μm, BET specific surface area 2,170 $m^2$, pore volume 1.38 $cm^3/g$) and 23 g of a carbon black (Ketjen ECP600JD) were mixed, to obtain 2,061 g of a mixed powder.

Figure 2A:
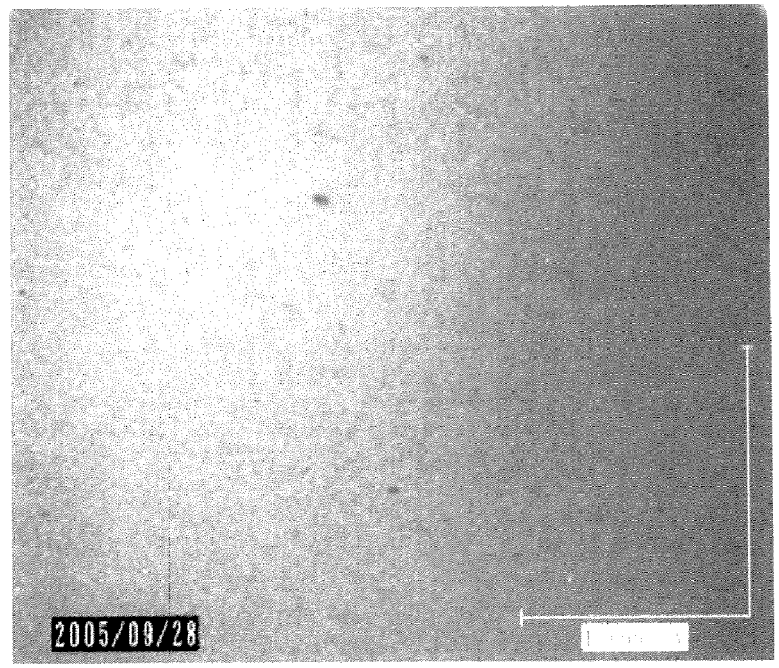
FIGS. 2(a) and (b) are optical micrographs of Examples 1 and 2 respectively.

The above mixed powder and 2,479 g of an aqueous dispersion of polytetrafluoroethylene (polytetrafluoroethylene concentration was 9.2%, surfactant concentration was 5% based on polytetrafluoroethylene) were subjected to the second mixing step to obtain 4,222 g of a granulated product (weight ratio of the activated carbon was 0.82 based on total solid content, the amount of water was 50%). This product was rolled by a calendar roll (70° C.), to obtain a sheet of 337 to 350 μm thick, about 300 mm wide and about 40 m long. At this time, forming of the sheet was successful without having breakage of the sheet during the step. In order to judge whether dispersion was good or bad, the rolling was further carried out to obtain a sheet of about 90 μm. FIG. 2(*a*) shows an optical micrograph at this time. Here, the scale shown in FIG. 2(a) shows that the length of the scale corresponds to 1 mm/div. As evident from FIG. 2(a), dispersion was good.

Example 2

In the first mixing step, 8 batches of the materials were mixed, in each of which 272 g of an activated carbon (manufactured by Kuraray Chemical Co., Ltd., a coconut shell type activated carbon, center grain size 7 μm, BET specific surface area 1,877 m$^2$, pore volume 0.97 cm$^3$/g) and 33 g of a carbon black (Ketjen ECP600JD) were mixed, to obtain 2,416 g of a mixed powder.

Figure 2B:

The above mixed powder and 2,172 g of an aqueous dispersion of polytetrafluoroethylene (polytetrafluoroethylene concentration was 12.3%, surfactant concentration was 5% based on polytetrafluoroethylene) were subjected to the second mixing step to obtain 4,110 g of a granulated product (weight ratio of the activated carbon was 0.8 based on total solid content, the amount of water was 42%). This product was rolled by a calendar roll (70° C.), to obtain a sheet of 315 to 327 μm thick, about 300 mm wide and about 45 m long. At this time, forming of the sheet was successful without having breakage of the sheet during the step. In order to judge whether dispersion was good or bad, the rolling was further carried out to obtain a sheet of about 90 μm. FIG. 2(b) shows an optical micrograph at this time. Here, the scale shown in FIG. 2(b) shows that the length of the scale corresponds to 1 mm/div. Dispersion was good.

Example 3

In the first mixing step, 8 batches of the materials were mixed, in each of which 272 g of an activated carbon (manufactured by Kuraray Chemical Co., Ltd., a coconut shell type activated carbon, center grain size 8 μm, BET specific surface area 1,707 m$^2$, pore volume 0.73 cm$^3$/g) and 33 g of a carbon black (Ketjen ECP600JD) were mixed, to obtain 2,407 g of a mixed powder.

Figure 3A:
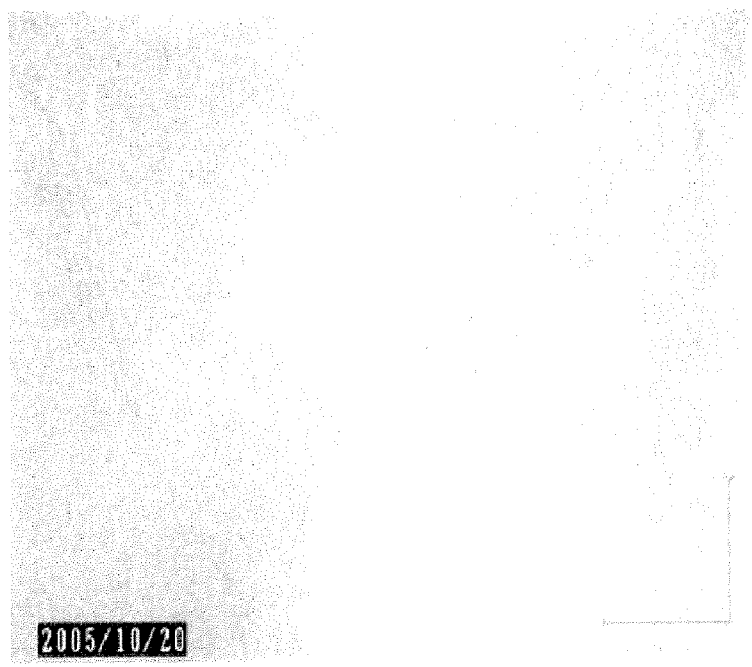
FIGS. 3(a) and (b) are optical micrographs of Examples 3 and 4 respectively.

The above mixed powder and 1,550 g of an aqueous dispersion of polytetrafluoroethylene (polytetrafluoroethylene concentration was 17.1%, surfactant concentration was 5% based on polytetrafluoroethylene) were subjected to the second mixing step to obtain 3,751 g of a granulated product (weight ratio of the activated carbon was 0.8 based on total solid content, the amount of water was 33%). This product was rolled by a calendar roll (70° C.), to obtain a sheet of 198 to 215 μm thick, about 300 mm wide and about 70 m long. At this time, forming of the sheet was successful without having breakage of the sheet during the step. In order to judge whether dispersion was good or bad, the rolling was further carried out to obtain a sheet of about 90 μm. FIG. 3(a) shows an optical micrograph at this time. Here, the scale shown in FIG. 3(a) shows that the length of the scale corresponds to 5 mm/div. Dispersion was good.

Example 4

In the first mixing step, 8 batches of the materials were mixed, in each of which 272 g of an activated carbon (manufactured by Kuraray Chemical Co., Ltd., a phenol type activated carbon, center grain size 5 μm, BET specific surface area 2,100 m$^2$, pore volume 1.00 cm$^3$/g) and 33 g of carbon black (Ketjen ECP600JD) were mixed, to obtain 2,407 g of a mixed powder.

Figure 3B:
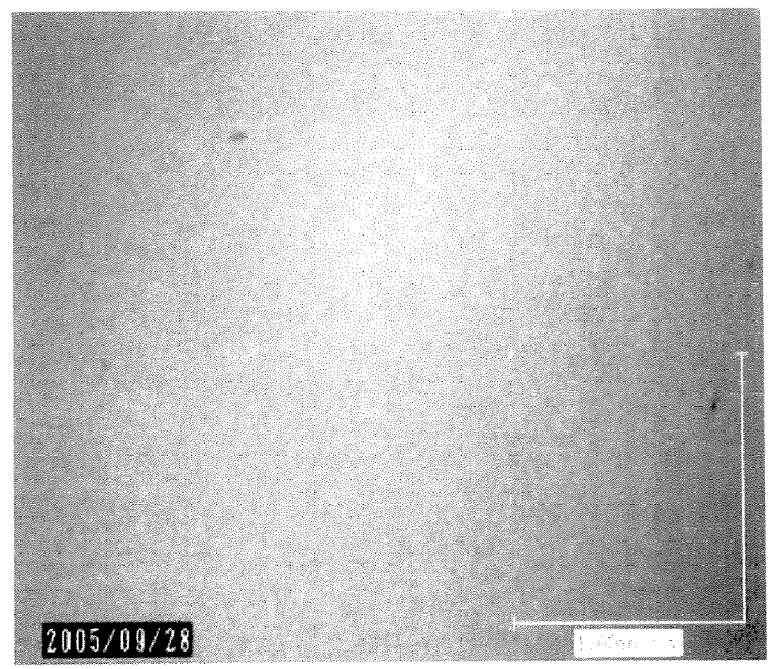

The above mixed powder and 2,027 g of an aqueous dispersion of polytetrafluoroethylene (polytetrafluoroethylene concentration was 13.2%, surfactant concentration was 5% based on polytetrafluoroethylene) were subjected to the second mixing step to obtain 4,281 g of a granulated product (weight ratio of the activated carbon was 0.8 based on total solid content, the amount of water was 40%). This product was rolled by a calendar roll (70° C.), to obtain a sheet of 200 to 219 μm thick, about 300 mm wide and about 60 m long. In order to judge whether dispersion was good or bad, the rolling was further carried out to obtain a sheet of about 90 μm. FIG. 3(b) shows an optical micrograph at this time. Here, the scale shown in FIG. 3(b) shows that the length of the scale corresponds to 1 mm/div. Dispersion was good.

Comparative Example 1

Figure 4A:
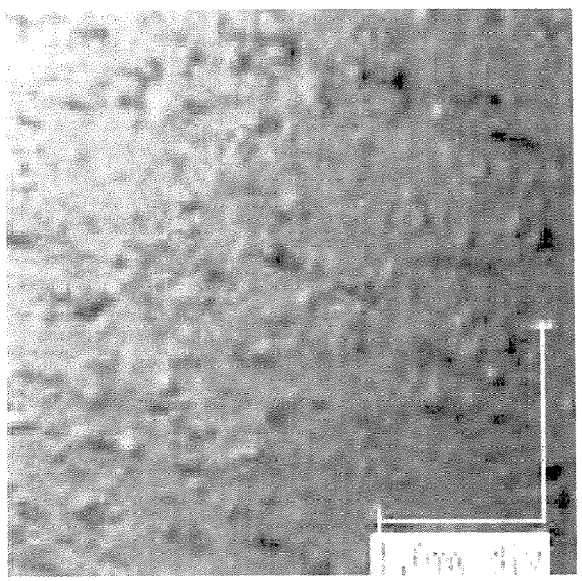
FIG. 4(a), 4(b) and 4(c) are optical micrographs of Comparative Example 1, 2 and 3 respectively.

An activated carbon having the composition of Example 1 and an aqueous dispersion of polytetrafluoroethylene, were directly put into a Henschel mixer without having the first mixing step, and the second mixing step was carried out to obtain the granulated product. The granulated product was rolled by rolls (70° C.) to form a sheet of 310 to 330 μm thick, about 300 mm wide and 40 mm long. To judge whether the dispersion was good or bad, the product was further rolled to be about 90 μm. FIG. 4(a) shows an optical micrograph at this time. Here, the scale shown in FIG. 4(a) shows that the length of the scale corresponds to 1 mm/div. As evident from FIG. 4(a), a large number of irregularities are observed which means that the dispersion was insufficient.

Comparative Example 2

Figure 4B:
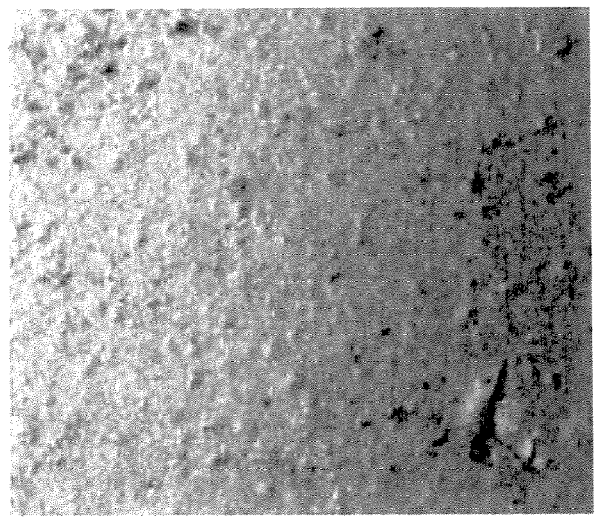

In the first mixing step, a Henschel mixer was used to mix the materials by blades rotating at a rotational speed of 1,760 rpm (peripheral velocity: 41 m/sec) for 60 minutes. Other than this point, the process was carried out in the same manner as in Example 1. FIG. 4(b) shows an optical micrograph at this time. Here, although there is no scale displayed in FIG. 4(b), the scale of the figure is the same as that of FIG. 4(a). As evident from FIG. 4(b), a large number of irregularities are shown, which shows that the dispersion was insufficient.

Comparative Example 3

Figure 4C:
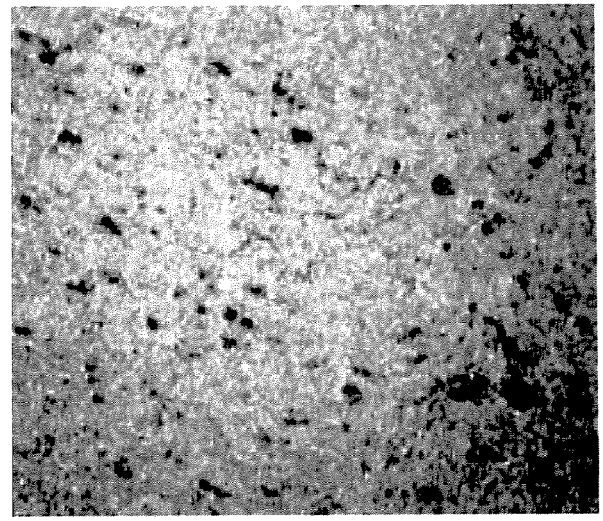
Figure 5:
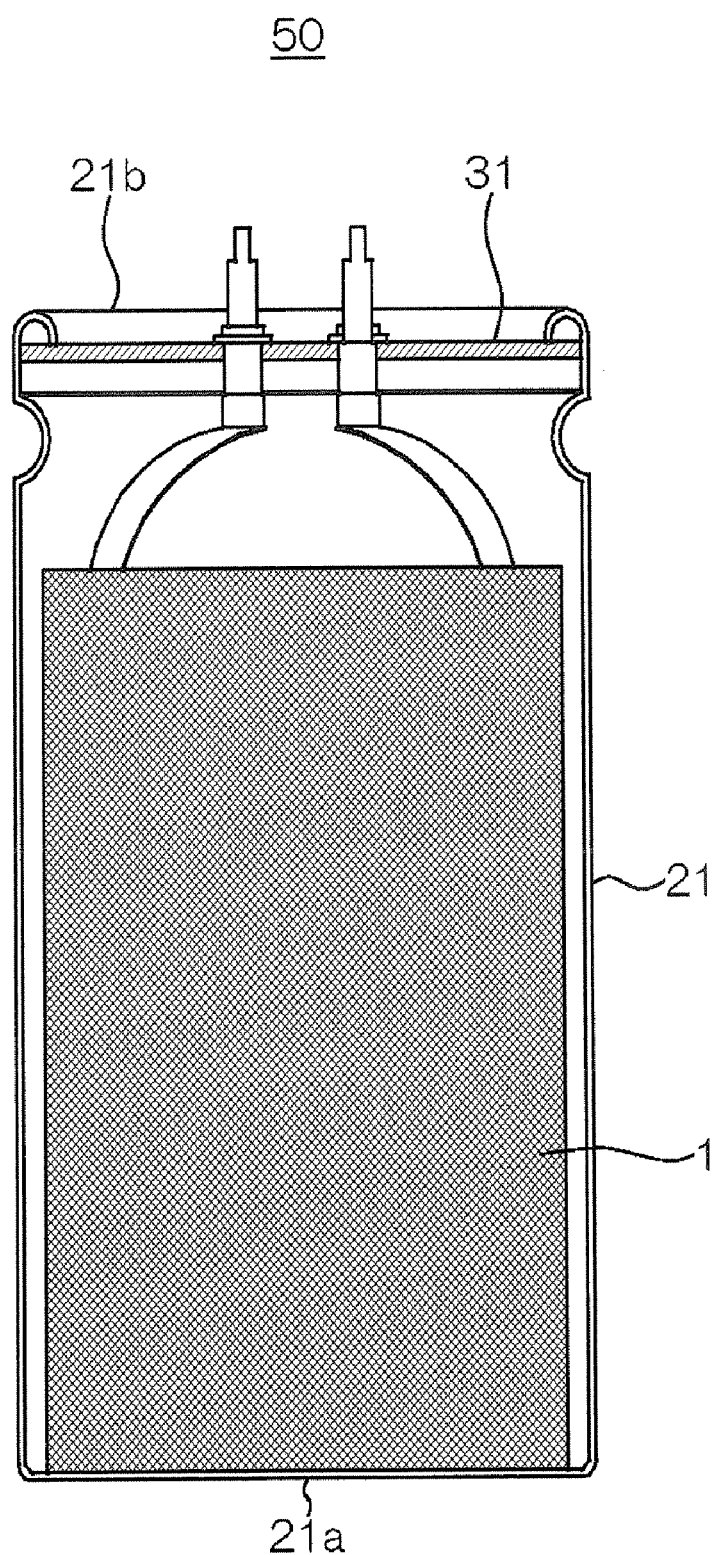
FIG. 5 is a vertical cross-sectional showing an example of an electric double layer capacitor.
Figure 6:
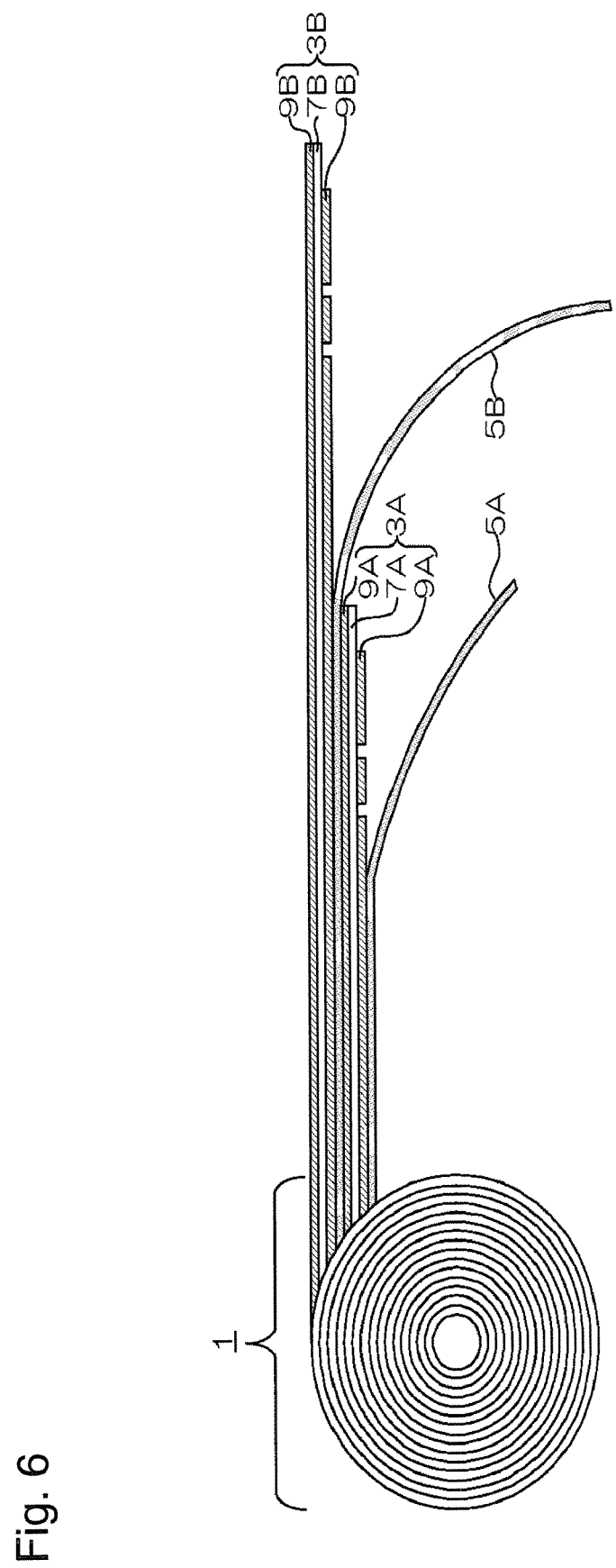
FIG. 6 is a construction view of an element assembly.

In the first mixing step, a Q mixer (manufactured by Mitsui Mining Co., Ltd.) was employed and mixing was carried out at a peripheral velocity of 100 m/sec for 5 minutes. The process was carried out in the same manner as in Example 1 except for this point. FIG. 4(c) shows an optical micrograph at this time. Here, although no scale is displayed in FIG. 4(c), the scale of the Figure is the same as that of FIG. 4(a). As evident from FIG. 4(c), a large number of irregularities are observed, which shows that the dispersion was insufficient.

The entire disclosure of Japanese Patent Application No. 2006-084182 filed on Mar. 24, 2006 including specification, claims, drawings and summary is incorporated herein by reference in its entirety.

What is claimed is:

1. A process for producing an electrode for an electric double layer capacitor, the electrode containing at least two carbonaceous materials and an organic binder, the process comprising a first mixing step of mixing the carbonaceous materials by a grinder containing a grinding medium, a second mixing step of adding polytetrafluoroethylene and a liquid lubricant to the mixture obtained in the first mixing step and mixing them by a wet method, and a forming step of forming the mixture obtained in the second mixing step into a sheet shape by passing the mixture between two opposing rolls.

2. The process for producing an electrode for an electric double layer capacitor according to claim 1, wherein the carbonaceous materials comprise an activated carbon and a carbon black having a specific surface area of from 500 to 1,500 m²/g.

3. The process for producing an electrode for an electric double layer capacitor according to claim 1, wherein in the second mixing step, the liquid lubricant is a water, and the polytetrafluoroethylene and the water are added as an aqueous dispersion of polytetrafluoroethylene containing a surfactant.

4. The process for producing an electrode for an electric double layer capacitor according to claim 3, wherein the aqueous dispersion of polytetrafluoroethylene contains polytetrafluoroethylene at a concentration of from 0.3 to 50.0% based on total mass of the aqueous dispersion, and contains the surfactant at a content of 3.0 to 12% based on polytetrafluoroethylene.

5. The process for producing an electrode for an electric double layer capacitor according to claim 4, wherein the amount x (weight ratio) of water in the mixture obtained in the second mixing step, is a value represented by formula (1) provided that the weight ratio of the activated carbon based on total solid content is (a) and the pore volume of the activated carbon is Vcm³/g:

$$((V/(V+1/a)) \times 0.85) \leq x \leq (V/(V+1/a)) \quad (1).$$

6. The process for producing an electrode for an electric double layer capacitor according to claim 4, wherein the mixture obtained in the second mixing step is a granulated product at least 80% by mass of which has a grain size of at most 2 mm in diameter.

7. The process for producing an electrode for an electric double layer capacitor according to claim 4, wherein a mixer having a blade is used in the second mixing step, and the mixing is carried out by rotating the blade at a rotational speed producing a peripheral velocity of from 10 to 45 m/sec at the leading edge of the blade.

8. The process for producing an electrode for an electric double layer capacitor according to claim 3, wherein the amount x (weight ratio) of water in the mixture obtained in the second mixing step, is a value represented by formula (1) provided that the weight ratio of the activated carbon based on total solid content is (a) and the pore volume of the activated carbon is Vcm³/g:

$$((V/(V+1/a)) \times 0.85) \leq x \leq (V/(V+1/a)) \quad (1).$$

9. The process for producing an electrode for an electric double layer capacitor according to claim 3, wherein the mixture obtained in the second mixing step is a granulated product at least 80% by mass of which has a grain size of at most 2 mm in diameter.

10. The process for producing an electrode for an electric double layer capacitor according to claim 9, wherein the amount x (weight ratio) of water in the mixture obtained in the second mixing step, is a value represented by formula (1) provided that the weight ratio of the activated carbon based on total solid content is (a) and the pore volume of the activated carbon is Vcm³/g:

$$((V/(V+1/a)) \times 0.85) \leq x \leq (V/(V+1/a)) \quad (1).$$

11. The process for producing an electrode for an electric double layer capacitor according to claim 3, wherein a mixer having a blade is used in the second mixing step, and the mixing is carried out by rotating the blade at a rotational speed producing a peripheral velocity of from 10 to 45 m/sec at the leading edge of the blade.

12. The process for producing an electrode for an electric double layer capacitor according to claim 1, wherein the mixture obtained in the second mixing step is a granulated product at least 80% by mass of which has a grain size of at most 2 mm in diameter.

13. The process for producing an electrode for an electric double layer capacitor according to claim 1, wherein a mixer having a blade is used in the second mixing step, and the mixing is carried out by rotating the blade at a rotational speed producing a peripheral velocity of from 10 to 45 m/sec at the leading edge of the blade.

14. A process for producing an electric double layer capacitor, which is a process for producing an electric double layer capacitor comprising a positive electrode, a negative electrode, a separator disposed between the positive electrode and the negative electrode, and an electrolytic solution, wherein the positive electrode and the negative electrode contain at least two carbonaceous materials and an organic binder, and the process comprises a first mixing step of mixing the carbonaceous materials by a grinder containing a grinding medium, a second mixing step of adding polytetrafluoroethylene and a liquid lubricant to the mixture obtained in the first mixing step and mixing them by a wet method, and a forming step of forming the mixture obtained in the second mixing step into a sheet shape by passing the mixture between two opposing rolls.

15. The process for producing an electric double layer capacitor according to claim 14, wherein the carbonaceous materials comprise an activated carbon and a carbon black having a specific surface area of from 500 to 1,500 m²/g.

16. The process for producing an electric double layer capacitor according to claim 14, wherein in the second mixing step, the liquid lubricant is a water, and polytetrafluoroethylene and the water are added as an aqueous dispersion of polytetrafluoroethylene containing a surfactant.

17. The process for producing an electric double layer capacitor, according to claim 16, wherein the aqueous dispersion of polytetrafluoroethylene contains polytetrafluoroethylene at a concentration of from 0.3 to 50.0% based on total mass of the aqueous dispersion, and contains the surfactant at a content of 3.0 to 12% based on polytetrafluoroethylene.

18. The process for producing an electric double layer capacitor according to claim 16, wherein the amount x (weight ratio) of water in the mixture obtained in the second mixing step, is a value represented by formula (1) provided that the weight ratio of the activated carbon based on total solid content is (a) and the pore volume of the activated carbon is Vcm³/g:

$$((V/(V+1/a)) \times 0.85) \leq x \leq (V/(V+1/a)) \quad (1).$$

19. The process for producing an electric double layer capacitor according to claim 14, wherein the mixture obtained in the second mixing step is a granulated product at least 80% by mass of which has a grain size of at most 2 mm in diameter.

20. The process for producing an electric double layer capacitor according to claim 14, wherein a mixer having a blade is used in the second mixing step, and the mixing is carried out by rotating the blade at a rotational speed producing a peripheral velocity of from 10 to 45 m/sec at the leading edge of the blade.

* * * * *